June 14, 1927.                R. H. LLOYD                1,632,611
                COMBINED FROST PREVENTING AND IRRIGATING DEVICE
                            Filed Sept. 15, 1925
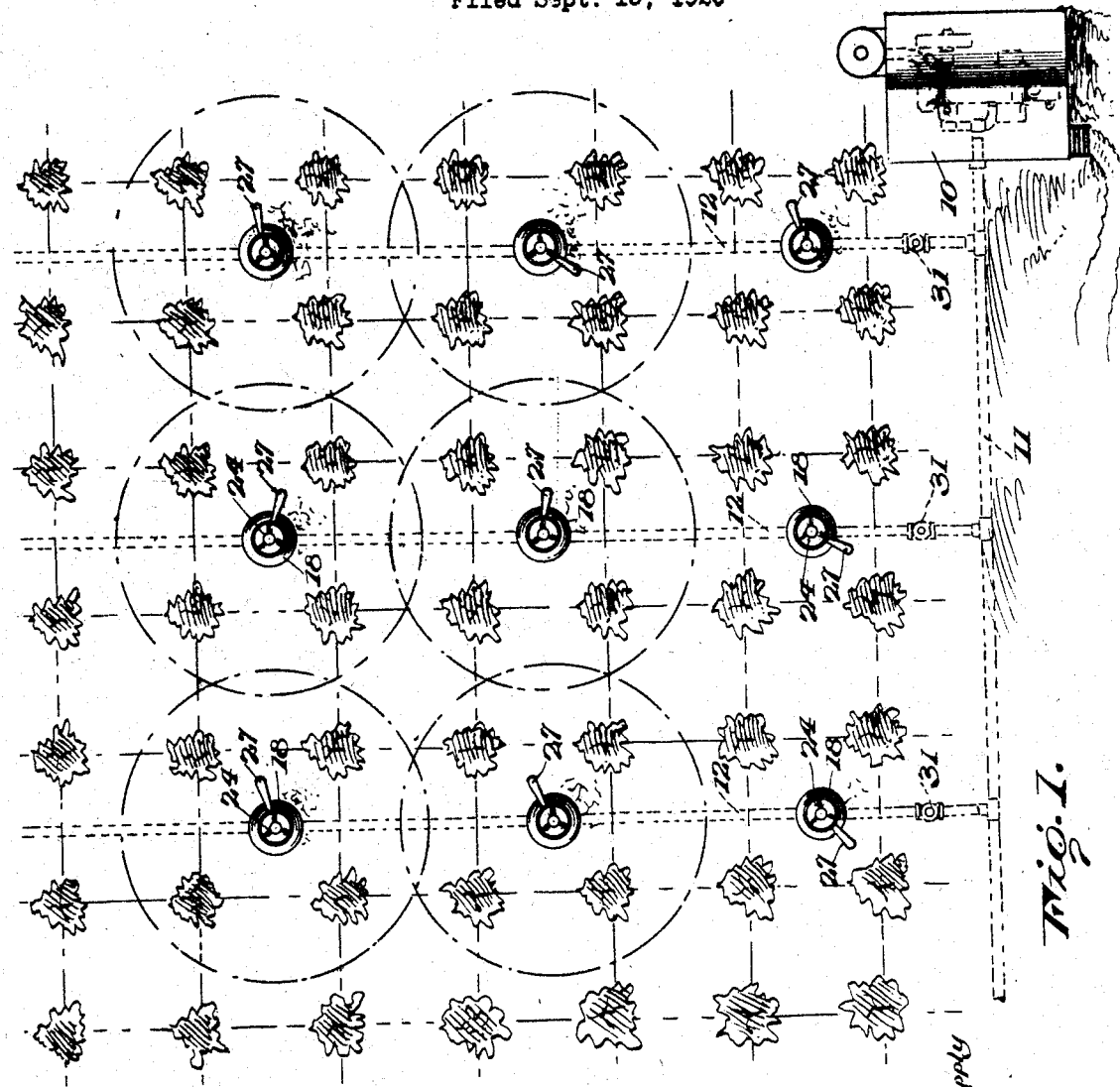
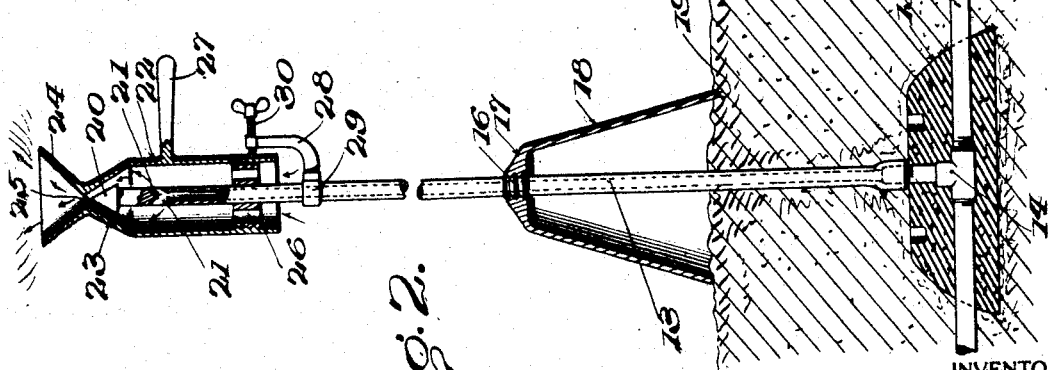
WITNESSES
W. A. Williams
INVENTOR
Richard H. Lloyd
BY
ATTORNEYS Patented June 14, 1927.

1,632,611

UNITED STATES PATENT OFFICE.

RICHARD HUGHES LLOYD, OF HASTINGS, WEST VIRGINIA.

COMBINED FROST-PREVENTING AND IRRIGATING DEVICE.

Application filed September 15, 1925. Serial No. 56,498.

This invention relates to a combined frost preventing and irrigating device and has for its object the provision of a device for supplying a fine mist or spray when there is danger of frost to prevent trees or plants from being injured by the frost and which may be employed during dry spells for supplying sufficient moisture to prevent burning of said plants or trees.

A further object of the invention is the provision of a system of pipes connected with a source of water under pressure and from which rise stand pipes supported by cast iron bell shaped stands, with the free end of the stand pipe being equipped with an adjustable nozzle for regulating the flow of water and for producing either a fine spray or mist or a substantial flow for irrigating purposes.

This invention will be best understood from a consideration of the following detailed description, in view of the accompanying drawings forming a part of the specification; nevertheless it is to be understood that the invention is not confined to the disclosure, being susceptible of such changes and modifications which shall define no material departure from the salient features of the invention as expressed in the appended claim.

In the drawings:

Figure 1 shows more or less diagrammatically a plan view of my combined irrigating and frost preventing system.

Figure 2 is a vertical section showing the individual nozzle equipped pipe for supplying either a spray or flow of water.

Referring more particularly to the drawings, 10 designates a power plant adapted to supply the main pipe line 11 with water under pressure and likewise branch lines 12.

At spaced points along the branch pipes are connected stand pipes 13 by means of an L-joint 14 mounted in a concrete disc 15 which is disposed below the surface of the ground and of a depth which is below the cultivating level. Portions of the branch pipes 12 are likewise located within the concrete disc 15.

At a point above the surface of the ground, stand pipe 13 is threaded as shown at 16 adapted to be screwed into the internally threaded passage of a head 17 of a bell shaped cast iron stand 18. This stand is open at the bottom with the lower peripheral edge as shown at 19 adapted to engage the ground. The stand may be provided with perforations to permit the circulation of air in order to prevent rusting of the stand pipe 13 and the stand 18. The upper end of the conduit 13 is provided with a conically shaped valve 20 below which are provided a plurality of angularly disposed passages 21 through which the water from pipe 13 is forced under pressure and adapted to be received within the hollow casing 22 which embraces the upper end of the stand pipe and has a frusto-conically shaped portion 23 cooperating with the valve 20 for producing a spray which issues from the conically shaped discharge member 24 which is in communication with the frusto-conically shaped member 23 by means of a restricted opening 25.

Rigidly secured to the upper end of the pipe 13 is a nut 26 having its external periphery threaded to receive the threads on the inner wall of the casing 22 so that when the casing is rotated by the handle 27 the frusto-conically shaped member 23 will be moved towards or away from the valve 20 and thereby either restrict or increase the flow of water from the nozzle depending upon whether the device is adapted to be used as a frost preventer or whether it is employed for irrigation. The nut 26 has openings through which air is drawn from the lower open end of the casing 22. The air is mixed with the water issuing from the nozzle and aids in producing a fine mist.

The bracket arm 28 is secured at 29 to the upper end of the pipe 13 and below the casing 22 and is provided with a set screw 30 adapted to engage the outer wall of the casing and lock the same against movement after the casing has been adjusted relative to the valve 20.

The operation of my device is as follows:

The power plant is set in operation and water is supplied under pressure to pipe 11 either directly by the power plant as shown at 10 or from a storage tank which is supplied by the power plant. Valves 31 are adapted to control the flow of the water to the branch pipes 12 and these branch pipes while not shown as extending in opposite directions are nevertheless so positioned in an orchard so that the power plant may be intermediately located for supplying the water in opposite directions from the main supply pipe 11. All of the nozzles are adjusted by loosening the set screw 30 and revolving the handle 27 until the frusto-conically shaped portion of the casing 22 is located a proper distance from the valve 20 and if the device is adapted to be used for preventing frost the handle is revolved until an extremely fine spray or mist issues from the spout 24. If it be desired to employ the device as an irrigating system during the dry season it is only necessary to rotate the casing 22 by the handle 27 until a proper supply of water flows from the spout 24.

It will be noted that the system employed in the present case provides for a nozzle at the central point between four trees and in this case sufficient spray or mist is provided to envelop the trees in the orchard and protect the same against frost or when the device is used as an irrigating system sufficient water will be supplied to maintain growth of the crops during the dry season.

The cast iron stands 10 have a double function in that they not only protect the stand pipes 13 from injury during cultivation but they also act as a shed for directing the water away from the soil surrounding the stand pipe 13 and thus prevent said soil from becoming soggy with a consequent play of the stand pipe because of the lack of proper support by the moistened soil.

What I claim is:

In a combined irrigating and frost preventing device, the combination of a stand pipe provided with a conically shaped closed upper end and having a plurality of apertures for the discharge of water, a casing embracing the upper end of the stand pipe and having a frusto-conically shaped upper end adapted to be moved towards or away from the conically shaped end of the stand pipe for restricting the flow of water from the stand pipe, said upper end of the casing being provided with a discharge opening adjacent the conically shaped end of the stand pipe, the lower end of the casing being open to the atmosphere, means for adjusting the frustoconically shaped end of the casing towards and away from the conically shaped end of the stand pipe, and means for locking the casing in its adjusted position.

RICHARD HUGHES LLOYD.